Feb. 22, 1938.   G. A. GLEASON   2,109,170
RETAINER FOR REEL LAGGING
Filed June 13, 1936   2 Sheets-Sheet 1
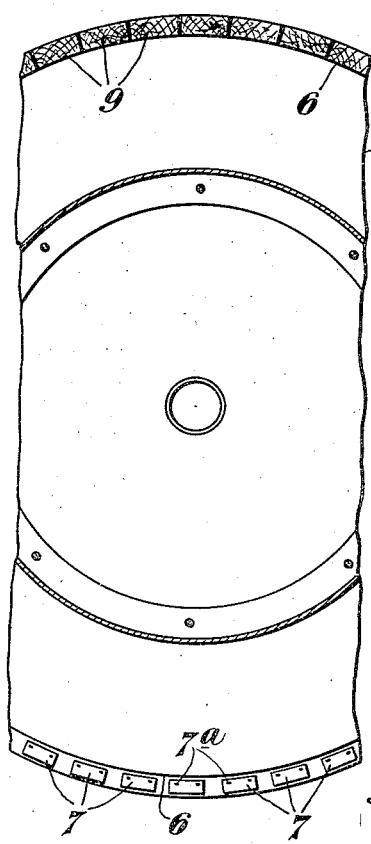
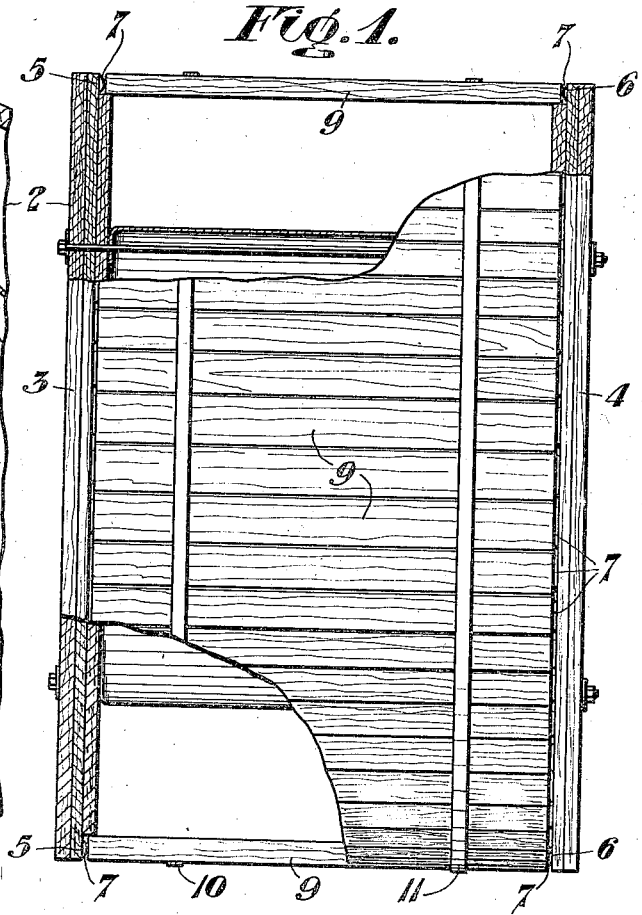
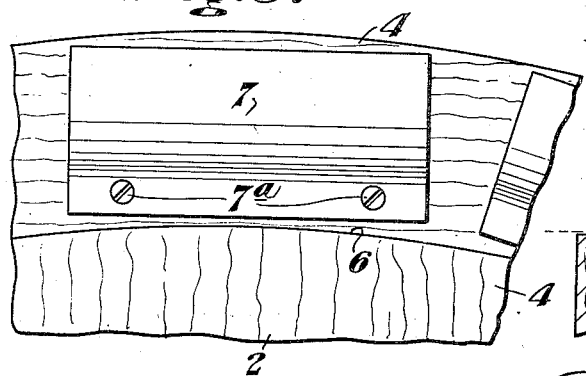
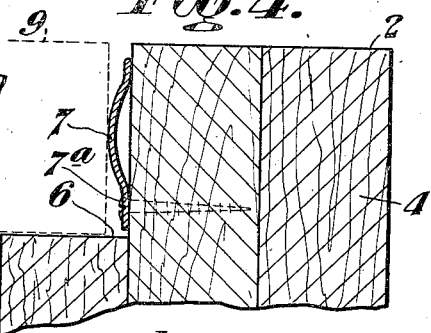
Inventor:
GEORGE A. GLEASON,
by his Attorneys.

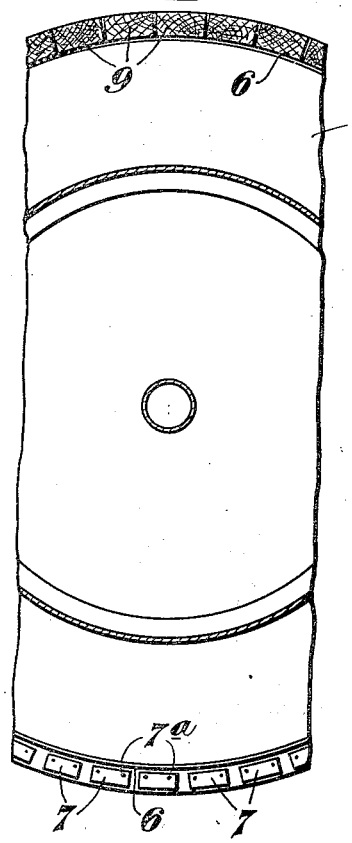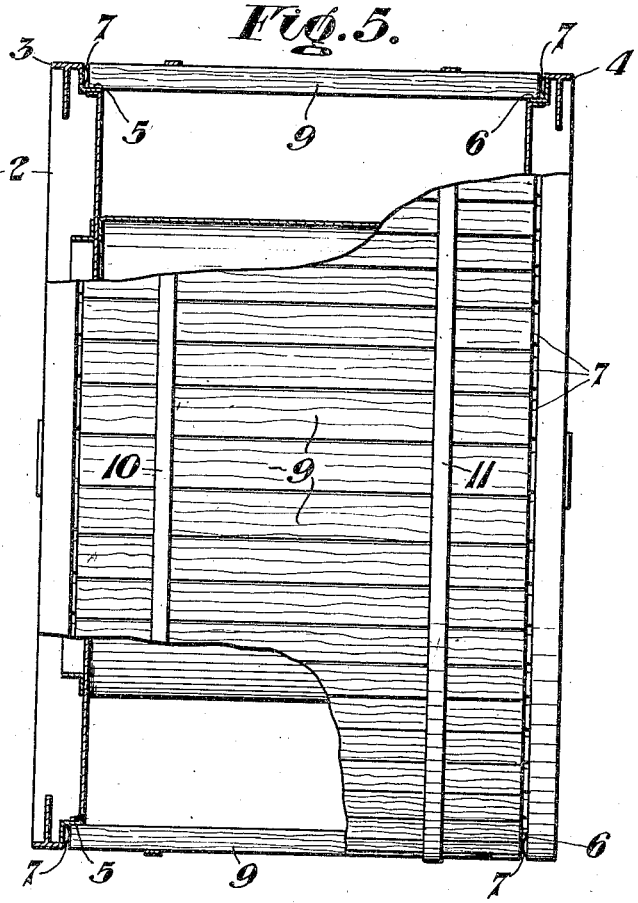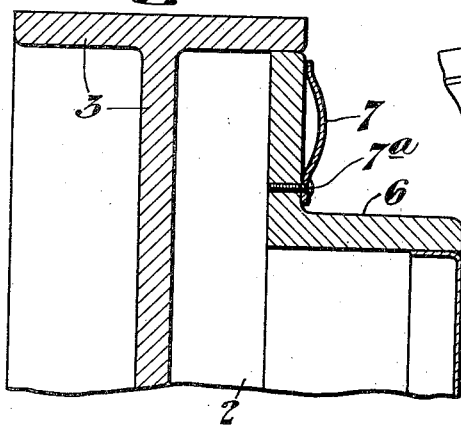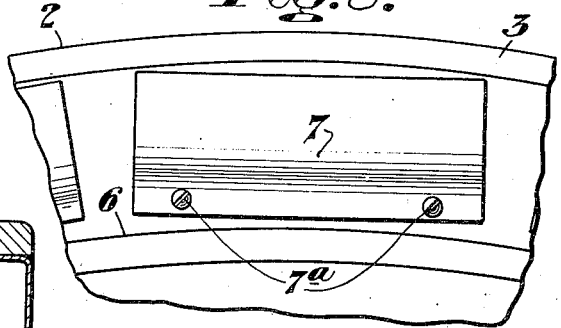

Patented Feb. 22, 1938

2,109,170

UNITED STATES PATENT OFFICE 2,109,170

RETAINER FOR REEL LAGGING

George A. Gleason, Worcester, Mass., assignor to The American Steel and Wire Company of New Jersey, a corporation of New Jersey Application June 13, 1936, Serial No. 85,162

4 Claims. (Cl. 206—59)

This invention relates to reels and more particularly to improved means for retaining the lagging in a reel so that such lagging can be removed without damaging the reel or the lagging.

At the present time whenever a considerable length of relatively heavy cable, wire or rope is sold, it is mounted on a reel so that the transporting and using of such material is simplified. The reel usually has lagging nailed to it around its circumference for the purpose of protecting the cable during transit and before use. When this lagging is removed the reel is damaged, and, oftentimes, nails are left in the reels, which cut or injure the cable when it is removed.

As the reels are ordinarily returned to the manufacturer for use again and again, and the customer doesn't want his cable injured in removing it from the reel, both are interested in using lagging which, when removed, doesn't leave the reel in a damaged condition. Various means other than nails have been provided to secure reel lagging, but they have been unsatisfactory in that ordinarily they are relatively expensive and cannot be conveniently operated by the unskilled laborer, and he will not use them as intended. Consequently, the reel is damaged in removing the lagging and the cable is harmed in removing it from the reel.

One object of this invention is to provide a reel with improved means for detachably securing laggings thereon, and said means being of such character that cable or other product carried by the reel may be readily removed from the reel without danger of damage resulting from contact with said means, and further that said means will permit removal of the laggings without damage to the reel or lagging.

Another object is to provide a reel with lagging-securing means which may be readily applied by unskilled labor, and at a minimum of expense.

Further objects and advantages of my invention will be brought out in the following specification and illustrated in the accompanying drawings in which:

Figure 1 is an end elevation, partly in section of a wooden reel with lagging fixed to it in accordance with my invention.

Figure 2 is a transverse section partly in elevation of Figure 1.

Figure 3 is an enlarged front elevation of a clip.

Figure 4 is a transverse section of Figure 3.

Figure 5 is the same as Figure 1 except that a steel reel replaces the wood reel.

Figure 6 is a transverse section partly in elevation of Figure 5.

Figure 7 is an enlarged transverse section of a clip and its mounting means.

Figure 8 is an enlarged front elevation of a clip.

In the specific form of the invention shown in the accompanying drawings the numeral 2 indicates generally a reel which may be made from wood, metal or other material as desired. The reel 2 has reel heads 3 and 4 which have right angle recesses 5 and 6, respectively, on the inside surface of and completely around said heads at their circumferences. The exact shape of these recesses can easily be varied if found desirable. In all events, the recesses 5 and 6 are of such depth that when lagging 9 is placed in them, the lagging 9 is flush with the circumference of the reel heads 3 and 4.

The recesses 5 and 6 have spring clips 7 mounted by one end on the radially extending sides of said recesses by any convenient means such as screws 7ª. The clips are circumferentially spaced on the radial sides of the recesses so as to provide one pair of clips for each piece of lagging. However, any variation in the kind or number of the retainer means so that the lagging is held between the reel heads by pressure, which is produced by inserting the lagging 9 between the reel heads 3 and 4, is contemplated by the invention.

In actual use the lagging 9 is cut or made to such size that it fits between the reel heads 3 and 4 when it is placed in the recesses 5 and 6 so as to be perpendicular to said heads 3 and 4. By inserting the lagging 9 into the recesses 5 and 6, the clips 7 are flattened slightly so that they exert a pressure on the ends of the lagging 9 substantially perpendicular to the reel heads 3 and 4. This pressure acts on the lagging 9 as to resiliently mount it between the reel heads 3 and 4.

Each piece of lagging is put in flush with the adjacent piece so that when sufficient lagging 9 is applied around the reel 2, a substantially unbroken surface is presented on the circumference of said reel. The lagging 9 is firmly fixed in the recesses 5 and 6 by bands 10 and 11 of steel strapping, or other suitable material, placed entirely around the circumference of the reel 2, and secured under tension.

It is very easy to free the material in the sealed reel 2. The bands 10 and 11 are cut and one piece of the lagging 9 is pried out; then as the lagging is not fixed to the reel 2, but is only positioned by the clips 7, it can easily be pulled or knocked out. The reel 2 cannot be damaged by such operation as there is no permanent connection between the reel and its lagging. It is possible that a clip may, occasionally, be broken or damaged however, since they are all separate, it is quite easy to replace a damaged clip.

It should be appreciated that the invention is not limited to the forms shown nor described but it is actually defined by the appended claims.

I claim:

1. In combination, a reel including rigid heads, each of said heads being provided with a recess on its inside surface at its circumference and resilient means mounted in said recess to yieldably hold lagging between said reel heads.

2. In combination, a reel including reel heads each of which has a recess on the inside surface and at the circumference of said heads, spring clips on the vertical side of at least one of said recesses, means securing said clips in position, and lagging held between said heads by said clips.

3. In combination, a reel including reel heads each of which has a right angle recess on the inside surface and at the circumference of said heads, spring clips substantially C-shaped in cross-section, means mounting said clips on the vertical sides of both of said recesses, and lagging held between said heads by said clips in said recesses.

4. In combination, a reel including reel heads each of which has a right angle recess on the inside surface and at the circumference of said heads, spring clips substantially C-shaped in cross-section, means mounting said clips on the vertical sides of both of said recesses, lagging held between said heads by said clips in said recesses, and means around the circumference of said reel to positively secure said lagging to said reel.

GEORGE A. GLEASON.